United States Patent
Yoo et al.

(10) Patent No.: US 12,002,938 B2
(45) Date of Patent: Jun. 4, 2024

(54) BATTERY RACK AND POWER STORAGE DEVICE COMPRISING SAME

(71) Applicant: LG ENERGY SOLUTION, LTD., Seoul (KR)

(72) Inventors: Jae-Min Yoo, Daejeon (KR); Jeong-O Mun, Daejeon (KR); Eun-Gyu Shin, Daejeon (KR); Yoon-Koo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 512 days.

(21) Appl. No.: 17/298,375

(22) PCT Filed: May 12, 2020

(86) PCT No.: PCT/KR2020/006234
§ 371 (c)(1),
(2) Date: May 28, 2021

(87) PCT Pub. No.: WO2020/246721
PCT Pub. Date: Dec. 10, 2020

(65) Prior Publication Data
US 2022/0006139 A1 Jan. 6, 2022

(30) Foreign Application Priority Data
Jun. 5, 2019 (KR) ........................ 10-2019-0066645

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/647* (2015.04); *H01M 10/658* (2015.04); *H01M 50/24* (2021.01)

(58) Field of Classification Search
CPC ........... H01M 10/6556; H01M 10/613; H01M 10/647; H01M 10/658; H01M 50/24;
(Continued)

(56) References Cited

U.S. PATENT DOCUMENTS

2007/0144804 A1 6/2007 Pike et al.
2013/0122339 A1 5/2013 Chae et al.
(Continued)

FOREIGN PATENT DOCUMENTS

CN 102630352 A 8/2012
CN 203746929 U 7/2014
(Continued)

OTHER PUBLICATIONS

Extended European Search Report issued in application No. 20818712.0, dated Jan. 26, 2022.
(Continued)

*Primary Examiner* — Abdullah A Riyami
*Assistant Examiner* — Nader J Alhawamdeh
(74) *Attorney, Agent, or Firm* — Birch, Stewart, Kolasch & Birch, LLP (57) ABSTRACT

A battery rack includes a plurality of battery modules stacked on each other in a vertical direction; a rack case configured to accommodate the plurality of battery modules; and at least one firewall provided to at least one of both side surfaces of the rack case to prevent flame and heat from propagating toward an adjacent battery rack when a fire occurs.

8 Claims, 7 Drawing Sheets

(51) Int. Cl.
*H01M 10/647* (2014.01)
*H01M 10/658* (2014.01)
*H01M 50/24* (2021.01)

(58) Field of Classification Search
CPC ............ H01M 50/209; H01M 10/627; H01M 50/251; H01M 50/383; H01M 50/244; H01M 50/204; H01M 50/249; H01M 50/258; H01M 50/291; H01M 50/20; H01M 2220/10; Y02E 60/10; A62C 2/04; A62C 3/16; A62C 2/06; F25D 17/02
See application file for complete search history.

(56) References Cited

U.S. PATENT DOCUMENTS

| | | | |
|---|---|---|---|
| 2013/0134928 A1 | 5/2013 | Uchihasbi et al. | |
| 2013/0224537 A1 | 8/2013 | Choi et al. | |
| 2013/0280566 A1 | 10/2013 | Chung et al. | |
| 2017/0309979 A1* | 10/2017 | Lee | H01M 10/6566 |
| 2019/0140229 A1 | 5/2019 | Lindstrom et al. | |
| 2019/0334141 A1* | 10/2019 | Kwon | H05K 7/20 |
| 2022/0006139 A1* | 1/2022 | Yoo | H01M 10/658 |

FOREIGN PATENT DOCUMENTS

| | | | | |
|---|---|---|---|---|
| CN | 208564279 U | | 10/2017 | |
| CN | 108417743 A | | 8/2018 | |
| CN | 208862052 U | | 5/2019 | |
| JP | 2004-213965 A | | 7/2004 | |
| JP | 2010-2778/63 A | | 12/2010 | |
| JP | 2010277863 A | * | 12/2010 | |
| JP | 3177969 U | | 8/2012 | |
| KR | 10-2001-0028777 A | | 4/2001 | |
| KR | 10-2012-0134010 A | | 12/2012 | |
| KR | 10-1708717 B1 | | 3/2017 | |
| KR | 10-2017-0049382 A | | 5/2017 | |
| KR | 20170049382 A | * | 10/2017 | |
| KR | 10-2013-0019928 A | | 2/2018 | |
| KR | 10-1826933 B1 | | 2/2018 | |
| WO | WO 2012/015002 A1 | | 2/2012 | |
| WO | WO-2012015002 A1 | * | 2/2012 | ............... A62C 3/16 |

OTHER PUBLICATIONS

International Search Report (PCT/ISA/210) issued in PCT/KR2020/006234, dated Aug. 21, 2020.

* cited by examiner

BATTERY RACK AND POWER STORAGE DEVICE COMPRISING SAME

TECHNICAL FIELD

The present disclosure relates to a battery rack and an energy storage system including the battery rack.

The present application claims priority to Korean Patent Application No. 10-2019-0066645 filed on Jun. 5, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components. Here, according to various voltage and capacity requirements, an energy storage system may be configured to include battery racks, each having at least one battery pack that includes at least one battery module.

In the case of a conventional battery rack, when an abnormal situation occurs in at least one battery module among the plurality of battery modules in the rack case, ignition may occur in the battery module in which the abnormal situation occurs.

When ignition occurs in any one of the battery modules, if flame and heat propagate to the surrounding battery modules of an adjacent battery rack, it may lead to additional ignition, resulting in serious property damage or great personal injury.

Therefore, there is a need for a method of providing a battery rack capable of preventing flame and heat from propagating to adjacent battery modules when at least one of the battery modules is ignited, and a power storage device including the same.

DISCLOSURE

Technical Problem

Therefore, the present invention is directed to providing a battery rack, which may prevent flame and heat from propagating toward battery modules of an adjacent battery rack when at least one of the battery modules is ignited, and a power storage device including the same.

Technical Solution

In one aspect of the present disclosure, there is provided a battery rack, comprising: a plurality of battery modules stacked on each other in a vertical direction; a rack case configured to accommodate the plurality of battery modules; and at least one firewall provided to at least one side surface of the rack case to prevent flame and heat from propagating toward an adjacent battery rack when a fire occurs.

The battery rack may be provided in plural, the plurality of battery racks may be stacked in a horizontal direction, and the firewall may be disposed between the plurality of battery racks along the horizontal direction, respectively.

The at least one firewall may be provided in a plate shape to cover all side surfaces of the plurality of battery modules along the vertical direction.

The at least one firewall may be fixed to both the rack case and the plurality of battery modules.

The at least one firewall may be fixed to the rack case and the plurality of battery modules by screwing using fastening members.

The at least one firewall may include at least one coupling portion for coupling with the rack case; and at least one module coupling portion for coupling with the plurality of battery modules.

The at least one case coupling portion may a plurality of case coupling portions, and the plurality of case coupling portions may be disposed to be spaced apart from each other by a predetermined distance along a vertical direction of the at least one firewall.

The at least one module coupling portion may be a plurality of module coupling portions, and the plurality of module coupling portions may be spaced apart from the case coupling portion by a predetermined distance and arranged to be spaced apart from each other by a predetermined distance along a vertical direction of the at least one firewall.

The at least one firewall may have at least one cooling channel formed therein to cool the plurality of battery modules.

In another aspect of the present disclosure, there is also provided an energy storage system, comprising: at least one battery rack according to the above embodiments; and a rack container configured to accommodate the at least one battery rack.

Advantageous Effects

According to various embodiments as described above, it is possible to provide a battery rack, which may prevent flame and heat from propagating toward battery modules of an adjacent battery rack when at least one of the battery modules is ignited, and a power storage device including the same.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
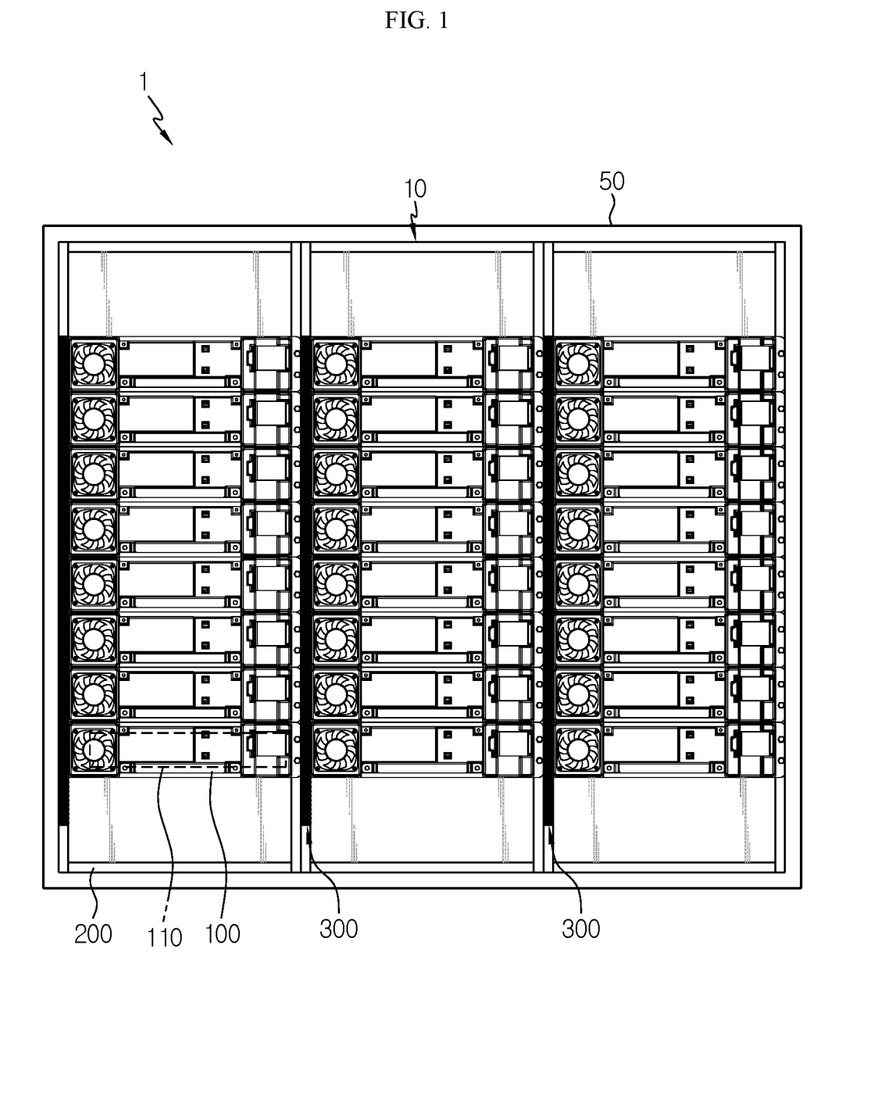
FIG. 1 is a diagram for illustrating an energy storage system according to an embodiment of the present disclosure.
Figure 2:
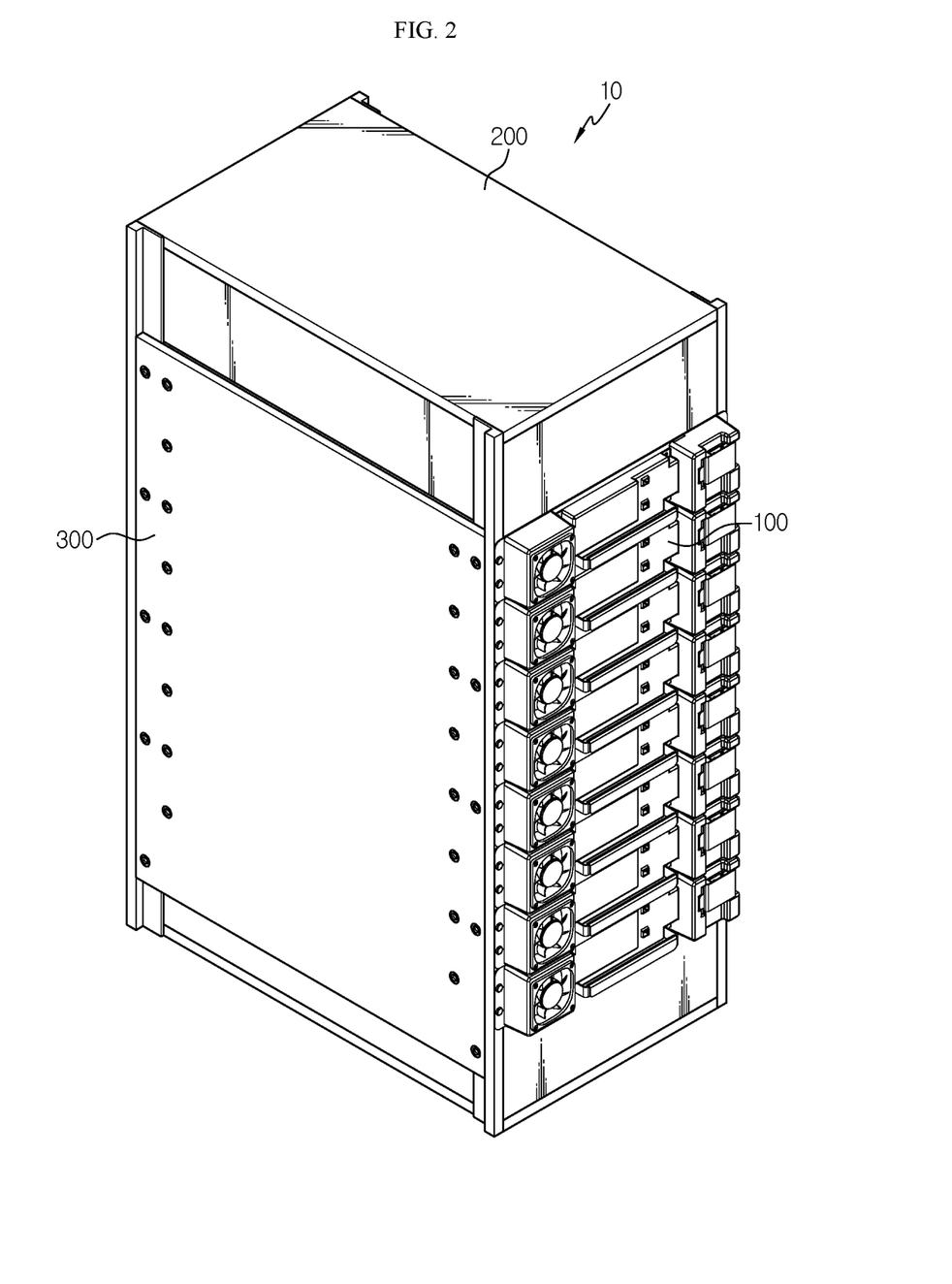
FIG. 2 is a diagram for illustrating a control operation of the energy storage system of FIG. 1.
Figure 3:
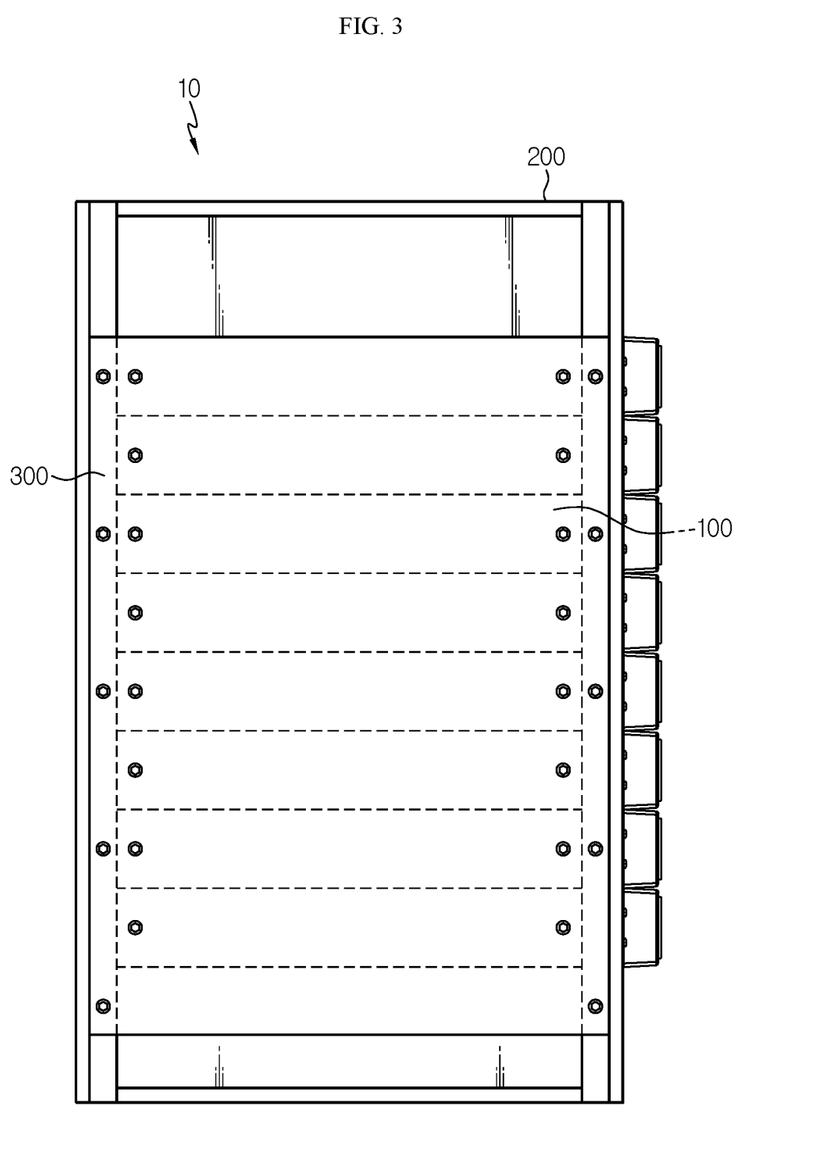
FIG. 3 is a cross-sectioned view showing the battery rack of FIG. 2.
Figure 4:
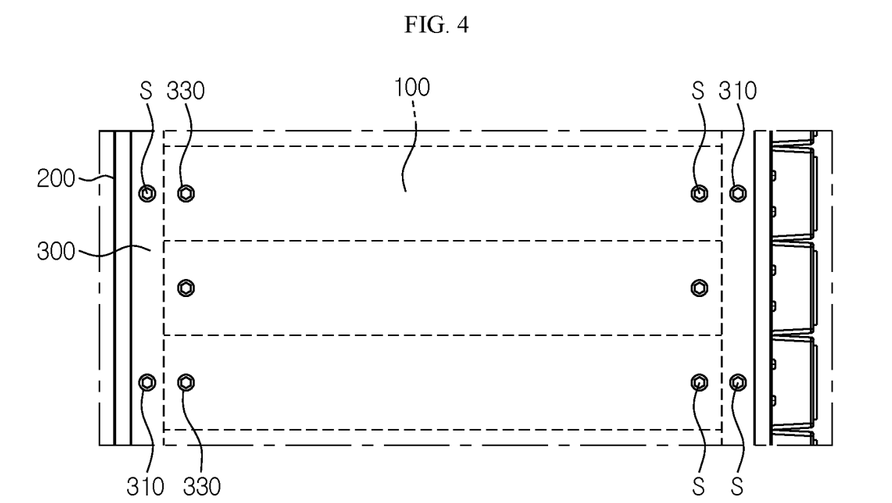
FIG. 4 is an enlarged view showing a main part of the battery rack of FIG. 3.

FIG. 1 is a diagram for illustrating an energy storage system according to an embodiment of the present disclosure, FIG. 2 is a diagram for illustrating a control operation of the energy storage system of FIG. 1, FIG. 3 is a cross-sectioned view showing the battery rack of FIG. 2, and FIG. 4 is an enlarged view showing a main part of the battery rack of FIG. 3.

Referring to FIGS. 1 to 4, an energy storage system 1 serves as an energy source and may be used for home or industrial use. The energy storage system 1 may include a battery rack 10 and a rack container 50 for accommodating the battery rack 10.

One battery rack 10 or a plurality of battery racks 10 may be provided. Hereinafter, in this embodiment, it will be described that a plurality of the battery racks 10 are provided to be stacked side by side along a horizontal direction, namely a left and right direction.

Each of the plurality of battery racks 10 may include a battery module 100, a rack case 200, and a firewall 300.

The battery module 100 may be provided in plural. The plurality of battery modules 100 may be stacked with each other in the vertical direction. Each of the plurality of battery modules 100 may include one or more battery cells 110.

The battery cell 110 is a secondary battery, and may be at least one of a pouch-type secondary battery, a rectangular secondary battery, and a cylindrical secondary battery. Hereinafter, in this embodiment, the battery cell 110 will be described as a pouch-type secondary battery.

The rack case 200 may accommodate the plurality of battery modules 100. To this end, the rack case 200 may have an accommodation space for accommodating the plurality of battery modules 100.

The firewall 300 is for preventing flame and heat from propagating toward a side surface of an adjacent battery rack 10 when a fire situation occurs, and may be provided to at least one of both side surfaces of the rack case 200.

At least one firewall 300 or a plurality of firewall 300 may be provided. Hereinafter, in this embodiment, it will be described that a plurality of firewalls 300 are provided between the rack cases 200 of the battery rack 10, respectively. That is, the plurality of firewalls 300 may be respectively disposed between the plurality of battery racks 10 along the left and right direction.

The plurality of firewalls 300 may be provided in a plate shape capable of covering all side surfaces of the plurality of battery modules 100 along the vertical direction, and may be fixed to both the plurality of battery modules 100 and the rack case 200. Specifically, the plurality of firewalls 300 may be fixed by screwing to the rack case 200 and the plurality of battery modules 100 by means of fastening members S.

Hereinafter, the fastening and fixing structure of the plurality of firewalls 300 will be described in more detail.

Each of the plurality of firewalls 300 may include a case coupling portion 310 and a module coupling portion 330.

The case coupling portion 310 is for coupling with the rack case 200 and may be provided in plural. The plurality of case coupling units 310 may be disposed to be spaced apart by a predetermined distance from each other along the vertical direction of the at least one firewall 300. The plurality of case coupling portions 310 may be fixed to the rack case 200 by screwing through the fastening members S.

The module coupling portion 330 is for coupling with the plurality of battery modules 100 and may be provided in plural. The plurality of module coupling portions 330 may be spaced apart from the case coupling portion 310 by a predetermined distance, and may be disposed to be spaced apart from each other by a predetermined distance along the vertical direction of the at least one firewall 300. The plurality of module coupling portions 330 may be fixed to the battery modules 100 by screwing through the fastening members S.

By means of the module coupling portion 330 and the case coupling portion 310, the battery modules 100 may be more stably fixed within the rack case 200. That is, through the case coupling portion 310 and the module coupling portion 330, the battery modules 100 are fixed to the rack case 200 even at the side surface of the battery rack 10, thereby more firmly securing the structural stability of the battery modules 100 accommodated in the rack case 200.

Accordingly, in this embodiment, by means of the firewall 300, the structural stability of the battery modules 100 accommodated in the rack case 200 of the battery rack 10 is increased, and vibration or seismic performance may also be further strengthened.

Figure 5:
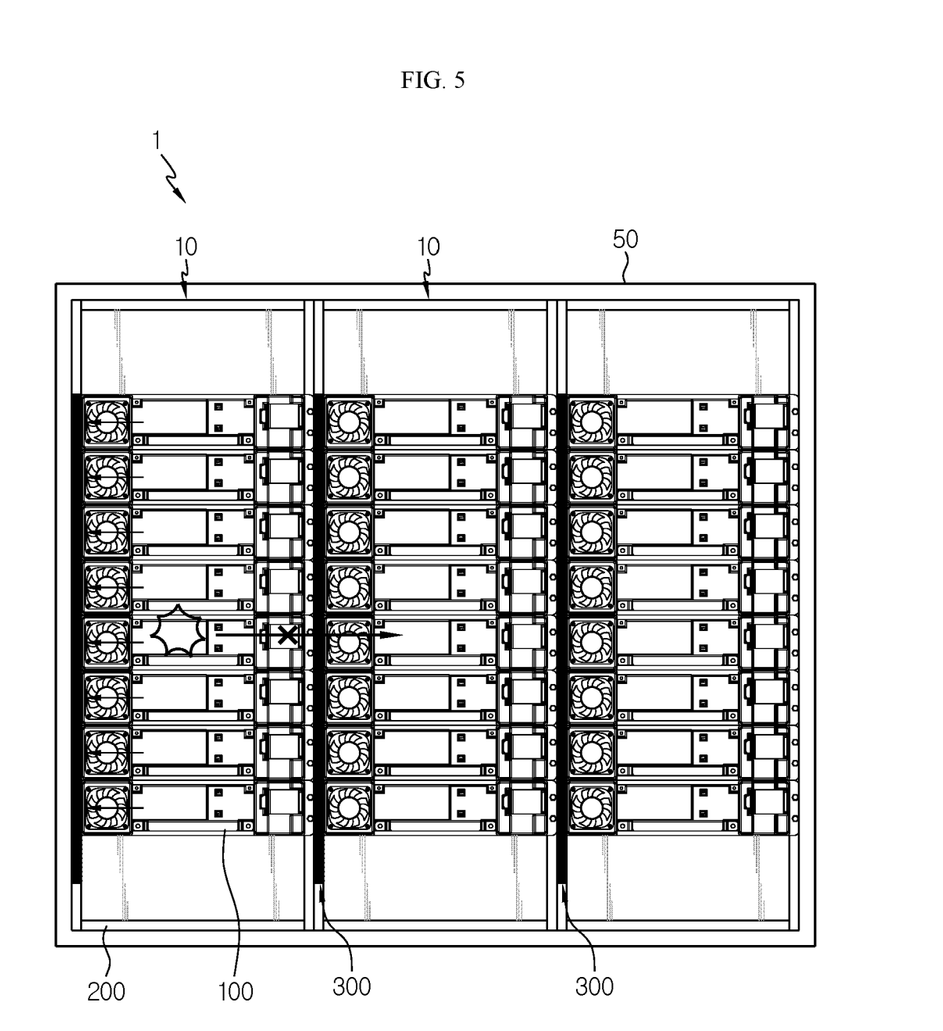
FIG. 5 is a diagram for illustrating heat absorption and flame transfer prevention when a fire situation occurs between battery racks of the power storage device of FIG. 1.

FIG. 5 is a diagram for illustrating heat absorption and flame transfer prevention between the battery racks of the energy storage system of FIG. 1 when a fire situation occurs.

Referring to FIG. 5, ignition may occur due to an abnormal situation in any one battery module 100 or the like in any one of the battery racks 10 of the energy storage system 1.

At this time, if flame and heat propagate from the battery rack 10 where the ignition has occurred to the adjacent battery racks 10, it may lead to additional ignition to cause serious property damage or great personal injury.

In this embodiment, when a fire situation such as ignition occurs through the firewalls 300 disposed between the battery racks 10, the propagation of flame and heat toward the adjacent battery racks 10 is prevented, thereby effectively preventing the flame and heat from propagating to the adjacent battery rack 10.

Figure 6:
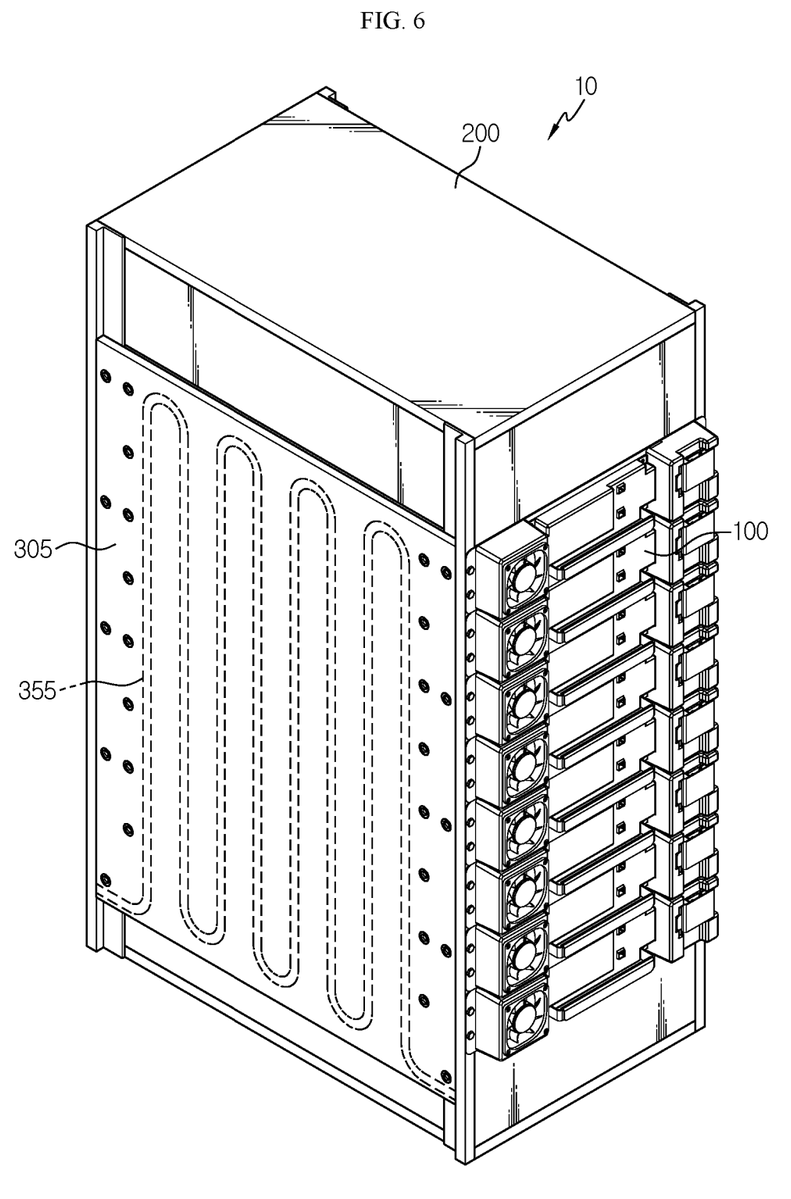
FIG. 6 is a diagram for illustrating a firewall according to another embodiment of the battery rack of the power storage device of FIG. 1.
Figure 7:
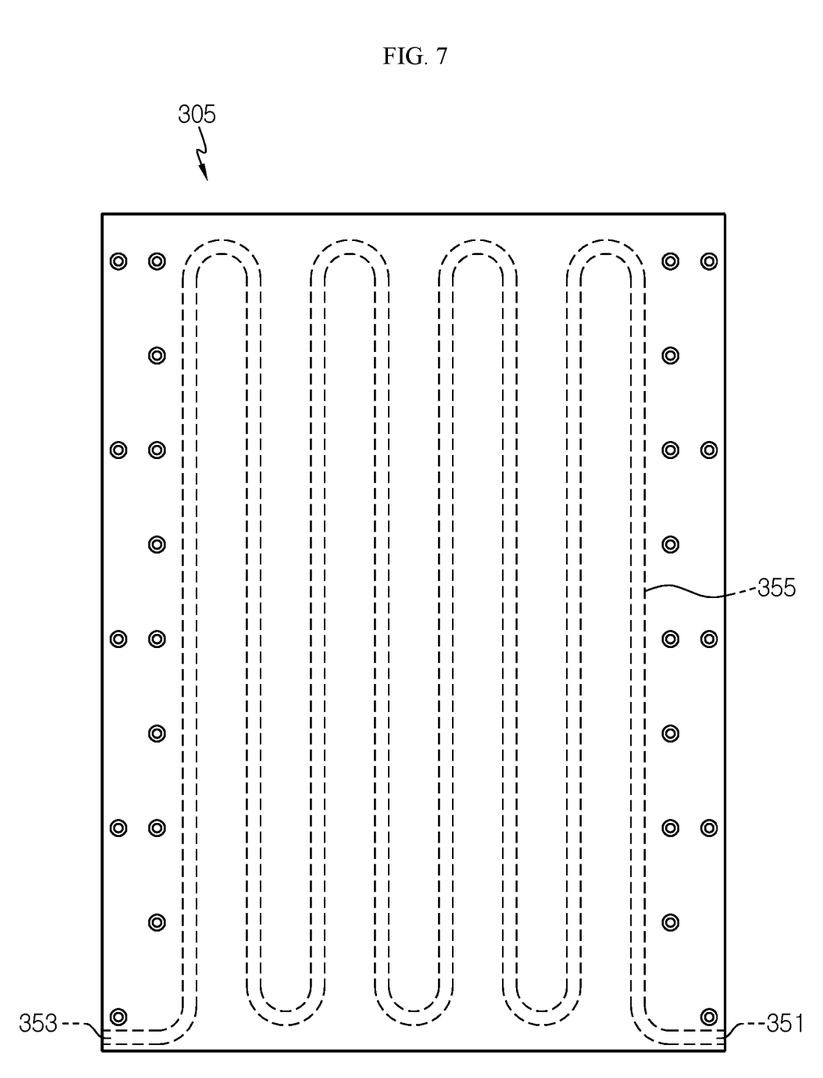
FIG. 7 is a diagram for illustrating a main part of the firewall of FIG. 6.

FIG. 6 is a diagram for illustrating a firewall according to another embodiment of the battery rack of the energy storage system of FIG. 1, and FIG. 7 is a diagram for illustrating a main part of the firewall of FIG. 6.

Since the firewall 305 according to this embodiment is similar to the firewall 300 of the former embodiment, configurations substantially identical or similar to the former embodiment will not be described again, and hereinafter, configurations different from the former embodiment will be described in detail.

Referring to FIGS. 6 and 7, the firewall 305 may include an inlet port 351, an outlet port 353, and a cooling channel 355.

The inlet port 351 and the outlet port 353 may communicate an external cooling system (not shown) and a cooling passage 355, explained later. The cooling channel 355 is for cooling the plurality of battery modules 100 and communicates with the inlet port 351 and the outlet port 353, and may circulate a cooling water supplied from the external cooling system inside the firewalls 305.

As described above, in this embodiment, since the cooling channel 355 connected to the external cooling system to circulate the cooling water is provided inside the firewalls 305, when an abnormal situation such as ignition occurs in the battery module 100, it is possible to more quickly absorb heat generated from the battery module 100 and more effectively prevent the flame from propagating toward the adjacent battery racks 10.

According to various embodiments as described above, it is possible to provide a battery rack 10 capable of preventing flame and heat from propagating toward the battery modules 100 of the adjacent battery rack 10 when at least one of the battery modules 100 is ignited, and an energy storage system 1 including the same.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery rack, comprising:
   a plurality of battery modules stacked on each other in a vertical direction;
   a rack case configured to accommodate the plurality of battery modules; and
   at least one firewall provided to at least one side surface of the rack case to prevent flame and heat from propagating toward an adjacent battery rack when a fire occurs,
   wherein the at least one firewall is fixed to both the rack case and the plurality of battery modules,
   wherein the at least one firewall includes:
   at least one case coupling portion for coupling with the rack case; and
   at least one module coupling portion for coupling with the plurality of battery modules.

2. The battery rack according to claim 1, wherein the battery rack is provided in plural,
   wherein the plurality of battery racks are stacked in a horizontal direction, and
   wherein the firewall is disposed between the plurality of battery racks along the horizontal direction, respectively.

3. The battery rack according to claim 1, wherein the at least one firewall is provided in a plate shape to cover all side surfaces of the plurality of battery modules along the vertical direction.

4. The battery rack according to claim 1, wherein the at least one firewall is fixed to the rack case and the plurality of battery modules by screwing using fastening members.

5. The battery rack according to claim 1, wherein the at least one case coupling portion is a plurality of case coupling portions, and
   wherein the plurality of case coupling portions are disposed to be spaced apart from each other by a predetermined distance along a vertical direction of the at least one firewall.

6. The battery rack according to claim 1, wherein the at least one module coupling portion is a plurality of module coupling portions, and
   wherein the plurality of module coupling portions are spaced apart from the case coupling portion by a predetermined distance and arranged to be spaced apart from each other by a predetermined distance along a vertical direction of the at least one firewall.

7. The battery rack according to claim 1, wherein the at least one firewall has at least one cooling channel formed therein to cool the plurality of battery modules.

8. An energy storage system, comprising:
   at least one battery rack as defined in claim 1; and
   a rack container configured to accommodate the at least one battery rack.

* * * * *